Sept. 7, 1965     C. I. WILLIAMS     3,204,416
GROUT PLUG FOR ROCK BOLTS
Filed April 15, 1963     2 Sheets-Sheet 1

CHESTER I. WILLIAMS
INVENTOR.

Sept. 7, 1965  C. I. WILLIAMS  3,204,416
GROUT PLUG FOR ROCK BOLTS

Filed April 15, 1963  2 Sheets-Sheet 2

CHESTER I. WILLIAMS

INVENTOR.

BY

United States Patent Office 3,204,416
Patented Sept. 7, 1965

3,204,416
GROUT PLUG FOR ROCK BOLTS
Chester I. Williams, 347 Greenbriar SE.,
Grand Rapids, Mich.
Filed Apr. 15, 1963, Ser. No. 273,127
2 Claims. (Cl. 61—45)

This invention relates to the construction of groutable rock bolts. A rock bolt is a device used in conjunction with construction projects, and is installed to secure a rock formation in position. Overhead bolts are used in tunnels and other excavations to prevent cave-in, and bolts are installed in other positions to prevent displacement of surface rock formations under a variety of conditions. The conventional rock bolt is essentially an assembly including a tension rod extending from an expansion device to a bearing plate resting against the surface of the rock. The expansion device and the rod are received in a hole drilled in the rock, and it is common to extend these devices eight to twelve feet from the surface, and more, in order to secure outer layers of the formation to a relatively solid base. After installation by insertion into the hole and "setting" the expansion device, the bolts are commonly "grouted" by pumping a cement into the hole around the rod under high pressure.

The present invention provides for sealing the rock bore around the rod at the surface so that the requisite grout pressure can be developed. Conventional installation procedures have utilized a settable plastic compound which is manually pressed into place around the rod where it emerges from the hole, and the handling and application of such material represents a decided inconvenience to the workman. The time required to install this material adds to the cost of the installation, and it is difficult to be sure that the resulting seal will be adequate to resist the grout pressure. The present invention eliminates the use of the plastic composition entirely, and provides a unitary sealing plug that can be carried in the workman's pocket and slipped into place almost as easily as he would apply a washer on an ordinary bolt. The device is adapted to accommodate the tubing that normally is mounted beside the rock bolt, and which emerges from the hole to function either as a vent or as a conduit for the grout. The several features of the invention will be analyzed in further detail through a discussion of the embodiments illustrated in the accompanying drawings. In the drawings:

Figures 1, 2:
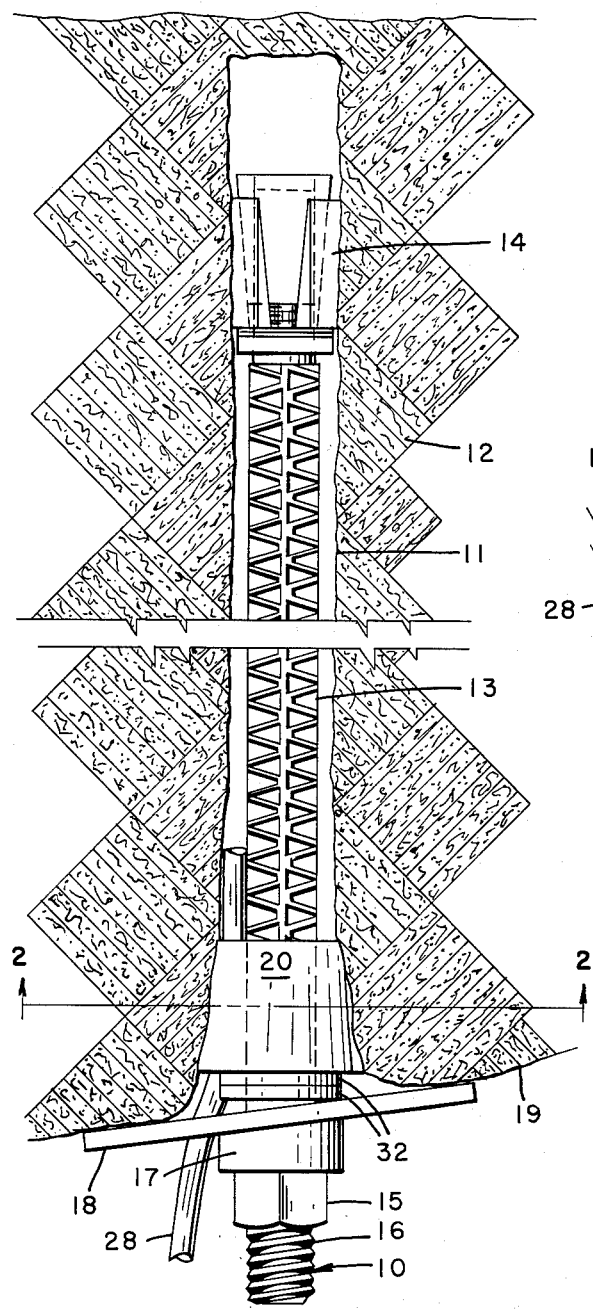
FIGURE 1 shows a sectional elevation of an overhead installation of a rock bolt incorporating the grout plug assembly provided by this invention.
FIGURE 2 is a section on the plane 2—2 of FIGURE 1.
Figure 3:
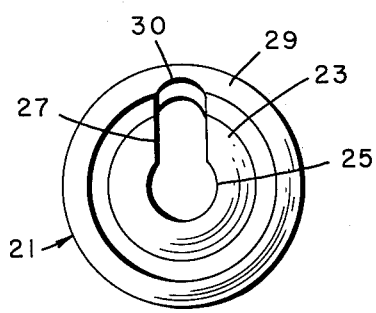
FIGURE 3 is an end elevation of the resilient outer shell of the grout plug.
Figure 4:
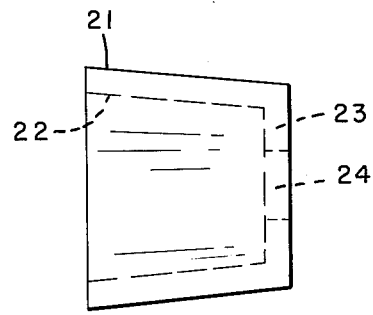
FIGURE 4 is a side elevation in projection with respect to FIGURE 3.
Figure 5:
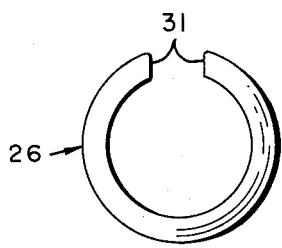
FIGURE 5 is an end elevation of the metal reinforcing core of the grout plug.
Figure 6:
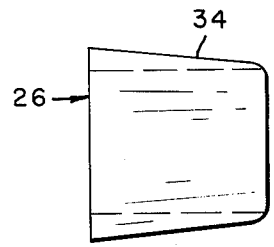
FIGURE 6 is a side elevation in projection with respect to FIGURE 5.

Referring to the drawings, the rock bolt assembly generally indicated at 10 in installed in the drilled hole 11 in the rock formation 12. The bolt assembly includes the tension rod 13, which is preferably tubular so that the rod may itself function as a conduit. It is also preferable that the surface of the rod 13 be corrugated more or less as shown to increase the bond between the grout and the rod. This invention is also usable in conjunction with solid or hollow bolts that are crimped to an undulating configuration. The bolt assembly also includes the expansion device 14 which is expanded to an enlarged diameter by rotation of the rod with respect to the expansion device in a conventional manner. Portions of the expansion device are thus driven solidly into the wall of the hole 11, and provided for the retention of the rock bolt against the pressure of the grout. Particular forms of the expansion device are also sufficiently effective to form a base against which a major portion of the strength of the rod 13 may be developed. The details of this portion of the rock bolt assembly form no part of the present invention.

The surface portion of the rock bolt assembly includes the nut 15 engaging the threaded end 16 of the rod 13, and a bearing washer 17 for the application of forces to the plate 18 resting against the surface 19 of the rock formation. It is normal for the hole 11 to exhibit a flaring tendency near the surface as a result of break-out of fragments of rock during the action of the drill. The sealing device generally indicated at 20 is therefore tapered to allow for hole variations, which will occur even through the use of standard size drills. The taper will not only accommodate the flare referred to above, but will also accept a considerable tolerance in hole diameter.

The construction of the sealing device 20 is best shown in FIGURES 2 through 6. The outer resilient sleeve 21 is preferably made of rubber or some similar composition that is resiliently deformable in order to accommodate itself to the surface irregularities in the rock. Preferably, the shell 21 has an interior cavity 22 for accommodating the metal reinforcing core shown in FIGURES 5 and 6. The cavity 22 extends over a fractional part of the length of the sleeve 21, leaving an end panel 23 with a central hole 24 for receiving the rod 25. The reinforcing core 26 is received within the cavity 22, and extends to the end panel 23 so that pressure applied to the larger end of the tapered assembly will tend to pull the resilient outer sleeve along with the reinforcing member as the latter is shoved into place. The end panel 23 of the sleeve 21 is provided with a lateral opening 27 forming a keyhole-shaped configuration with the central hole 25. The opening 27 provides clearance for the flexible tube 28, which must emerge from the hole 11 beside the rod 13. It is also preferable that the peripheral wall 29 of the resilient sleeve 21 be grooved as shown at 30 to provide added clearance. The metal core 26 is preferably discontinuous at 31, and the gap at this point embraces the tube 28, as best shown in FIGURE 2. The discontinuity of the reinforcing core 26 at the point 31 permits the exterior pressure generated between the resilient sleeve 21 and the surrounding rock to close the core 26 slightly and increase the accommodative power of the core-sleeve combination, and yet the solidity of the ends of the core 26 at the discontinuity 31 provide a protection to the tube 28 so that pressure and other forces do not shut off the flow in the tube.

Figure 7:
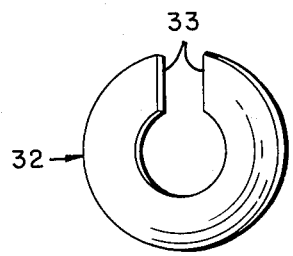
FIGURE 7 is a view of the bearing washer of the type interposed between the grout plug and the surface bearing plate.

The variation in the degree of flaring of the hole, and also the variation in diameter which can be expected in such rough operations, will result in a variety of axial positions of the sealing plug with respect to the surface. The pressure necessary to generate the necessary seal is contributed by the rock bolt assembly itself, and a group of C-shaped bearing washers of the type shown in FIGURE 7 are preferably interposed between the bearing plate 18 and the ends of the sleeve 21 and the reinforcing core 26. A group of these washers 32 is selected according to the expected distance between the bearing plate and the sealing plug. The discontinuities 33 in the washers 32 provide a passage for the tube 28, which also traverses an opening in the bearing plate 18.

Tightening of the nut 15 applies the necessary forces through the washers 32 to drive or maintain the sealing plug in solid engagement with the wall of the hole 13. As this pressure becomes increasingly severe, the tapered peripheral surface 34 of the reinforcing core 26 acts against the similarly tapered surface of the recess 22 of the resilient sleeve to cause the material of the sleeve to flow into and block the irregularities and interstices of the rock. While it is probably impossible to obtain a complete blocking around the openings traversed by the tube 28, a sufficiently close approach of this can be provided for the development of adequate grout pressure.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a groutable rock bolt assembly which includes a tension rod having a threaded outer end, an expansion unit secured to an inner portion of said rod, a bearing plate engaging the outer portion of said rod and normally disposed against the surface of a rock formation, nut means engaging the threaded outer end of said rod, and a tube disposed beside said rod and traversing said bearing plate, a seal for closing a bore in a rock formation receiving said rod and expansion unit, comprising:
  a resiliently deformable sleeve having a tapered peripheral surface and normally surrounding said rod with the larger end of said sleeve facing outward, and
    said resilient sleeve having a central recess extending from the said larger end for a fractional part of the axial length of said sleeve;
  a core sleeve of reinforcing material having a peripheral surface engaging said recess, and having a substantially axial discontinuity for receiving said tube, said core and deformable sleeve having axially-abutting surfaces at the inner portion of said deformable sleeve to transfer axial forces from the outer end of said core sleeve to the inner portion of said deformable sleeve.

2. In combination with a groutable rock bolt assembly which includes a tension rod having a threaded outer end, an expansion unit secured to an inner portion of said rod, a bearing plate engaging the outer portion of said rod and normally disposed against the surface of a rock formation, nut means engaging the threaded outer end of said rod, and a tube disposed beside said rod and traversing said bearing plate, a seal for closing a bore in a rock formation receiving said rod and expansion unit, comprising:
  a resiliently deformable sleeve having a tapered peripheral surface and normally surrounding said rod with the larger end of said sleeve facing outward,
    said resilient sleeve having a tapered central recess extending from the said larger end for a fractional part of the axial length of said sleeve;
  a core sleeve of reinforcing material having a peripheral surface engaging said recess, and having a substantially axial discontinuity for receiving said tube; and C washer means normally interposed between said resilient sleeve and said bearing plate.

References Cited by the Examiner

UNITED STATES PATENTS

| 2,829,502 | 4/58 | Dempsey | 61—45 |
| 2,952,129 | 9/60 | Dempsey | 61—45 |
| 3,108,443 | 10/63 | Schuermann et al. | 61—45 |

FOREIGN PATENTS

| 231,847 | 8/56 | Australia. |
| 84,937 | 1/55 | Norway. |
| 84,938 | 1/55 | Norway. |

CHARLES E. O'CONNELL, *Primary Examiner.*

EARL J. WITMER, *Examiner.*